(12) United States Patent
Sonnenrein et al.

(10) Patent No.: US 8,406,750 B2
(45) Date of Patent: Mar. 26, 2013

(54) METHOD AND DEVICE FOR ESTABLISHING A COMMUNICATION CONNECTION BETWEEN A CONTROL CENTER AND A TERMINAL

(75) Inventors: Thomas Sonnenrein, Bockenem (DE); Joachim Attig, Hildesheim (DE); Norbert Bauer, Bad Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 1466 days.

(21) Appl. No.: 10/517,740

(22) PCT Filed: May 20, 2003

(86) PCT No.: PCT/DE03/01621
§ 371 (c)(1),
(2), (4) Date: Jul. 6, 2005

(87) PCT Pub. No.: WO03/105514
PCT Pub. Date: Dec. 18, 2003

(65) Prior Publication Data
US 2006/0046725 A1  Mar. 2, 2006

(30) Foreign Application Priority Data
Jun. 10, 2002 (DE) .................................. 102 25 784

(51) Int. Cl.
*H04M 3/00* (2006.01)
(52) U.S. Cl. ........ 455/418; 455/419; 455/420; 455/445; 455/450; 455/512

(58) Field of Classification Search .................. 455/445, 455/450, 512, 418–420
See application file for complete search history.

(56) References Cited

U.S. PATENT DOCUMENTS

| | | | | |
|---|---|---|---|---|
| 5,734,981 | A * | 3/1998 | Kennedy et al. | 455/445 |
| 6,091,945 | A * | 7/2000 | Oka | 455/411 |
| 6,317,607 | B1 * | 11/2001 | Tomcik et al. | 455/552.1 |
| 6,856,820 | B1 * | 2/2005 | Kolls | 455/575.9 |

FOREIGN PATENT DOCUMENTS

| | | |
|---|---|---|
| DE | 196 25 002 | 1/1998 |
| DE | 198 32 498 | 2/2000 |
| DE | 199 20 041 | 10/2000 |
| DE | 100 26 754 | 12/2001 |
| EP | 915595 | 5/2009 |
| JP | 4273354 | 9/1992 |
| JP | 10506240 | 6/1998 |
| JP | 11-136308 | 5/1999 |
| JP | 2000-403242 | 12/2000 |
| JP | 2002-204277 | 7/2002 |
| WO | WO 95/03665 | 2/1995 |
| WO | WO 95/34998 | 12/1995 |
| WO | WO 01/81107 | 11/2001 |

* cited by examiner

*Primary Examiner* — Charles Appiah
*Assistant Examiner* — Jaime Holliday
(74) *Attorney, Agent, or Firm* — Kenyon & Kenyon LLP

(57) ABSTRACT

A method for establishing a communication connection between a control center and a terminal is described, the control center (preferably a server) transmitting a request to establish a connection to a terminal (preferably a client), and in the case of a correct request, the terminal automatically establishing a connection (client-server communication) to the control center.

28 Claims, 3 Drawing Sheets

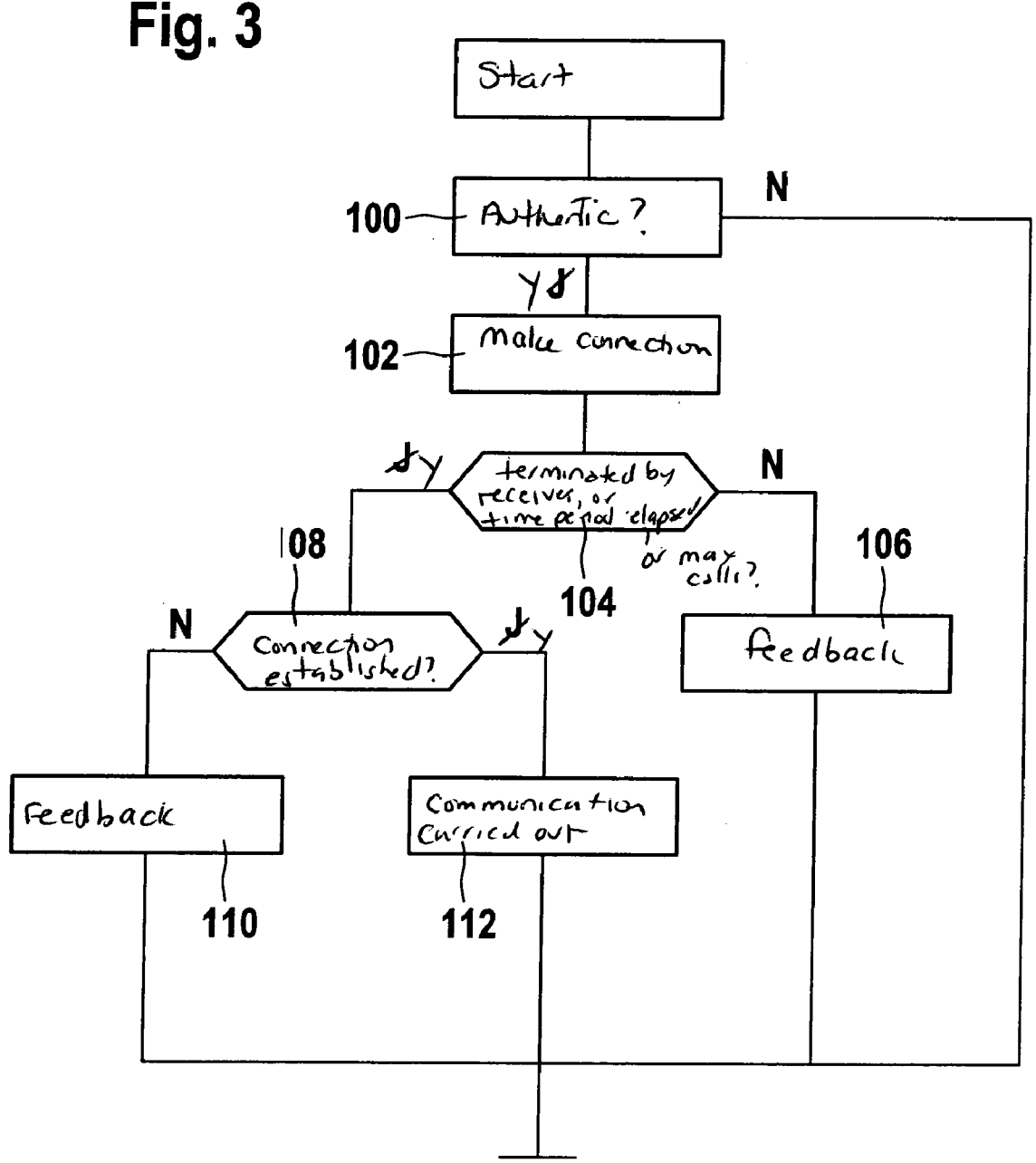

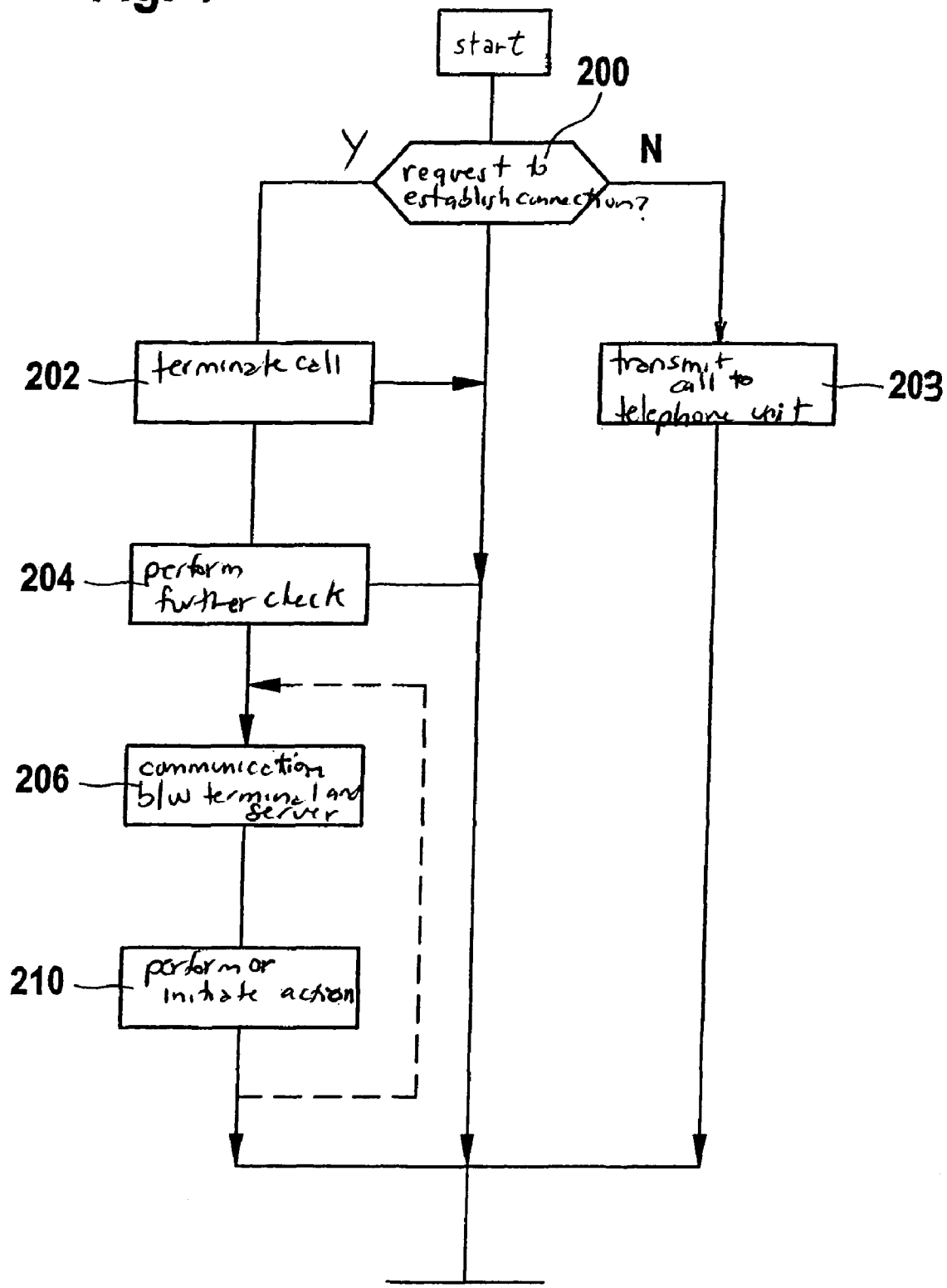

METHOD AND DEVICE FOR ESTABLISHING A COMMUNICATION CONNECTION BETWEEN A CONTROL CENTER AND A TERMINAL

FIELD OF THE INVENTION

The present invention relates to a method and a device for establishing a communication connection between a control center and a terminal, the latter being situated in a motor vehicle in particular.

BACKGROUND INFORMATION

Such a method and such devices are described in DE 100 26754 A1 in connection with remote diagnosis, remote control, etc., of at least one component or at least one vehicle function of a motor vehicle. The document proposes establishing a connection to the terminal or to a processing unit connected to the terminal via a mobile communication network and/or via a data network (for example the Internet) and performing remote diagnosis or remote control via this access path. The connection to the mobile telecommunication terminal is established by the user (for example, the owner of the motor vehicle) via the data network and/or the mobile communication network. A specific implementation of establishing a connection under consideration of reliability, speed, and/or security of the connection establishment is not given.

SUMMARY

An approach in which the terminal having a connection to a telephone network is prompted via an incoming call from a central computer to establish a connection to a central computer and to communicate with this computer has a number of advantages.

In particular, reliability, speed, and availability of the establishment of a connection are improved in a particularly advantageous manner. Because the establishment of a connection is initiated by a telephone call from the central computer to the terminal, it is ensured that the establishment of the connection functions wherever telephone accessibility is guaranteed. Contrary to a procedure in which a text message is transmitted to establish a connection, this type of establishing a connection is more reliable and faster, because if the subscriber is not reachable, immediate feedback follows. There are no problems of a delayed delivery of a text message (SMS for example) to the receiver, for example, when the control center and terminal are located in different countries whose mobile phone operators have no roaming agreement for messages or one of whom does not support the special message service.

The above-described method of establishing a connection also has the advantage of a considerable gain in security. The terminal is capable of checking the incoming calls and deciding whether or not these calls are intended and/or authorized to initiate a connection.

This increase in security contributes in particular to the possibility of remote diagnosis, remote maintenance, remote control, and/or software download being performed securely and reliably in connection with a motor vehicle.

In addition, cost and effort are saved, because the call initiating the communication connection is terminated upon completion of the check without information exchange, and because only a telephone unit, such as a mobile phone unit, which is present in the vehicle anyway is required for establishing the connection.

BRIEF DESCRIPTION OF THE DRAWINGS

The present invention is described in detail below with reference to the embodiments depicted in the figures.

FIGS. 3 and 4 are simplified flow charts illustrating the mode of operation of server and client in more detail.

DESCRIPTION OF EXAMPLE EMBODIMENTS

Figure 1:
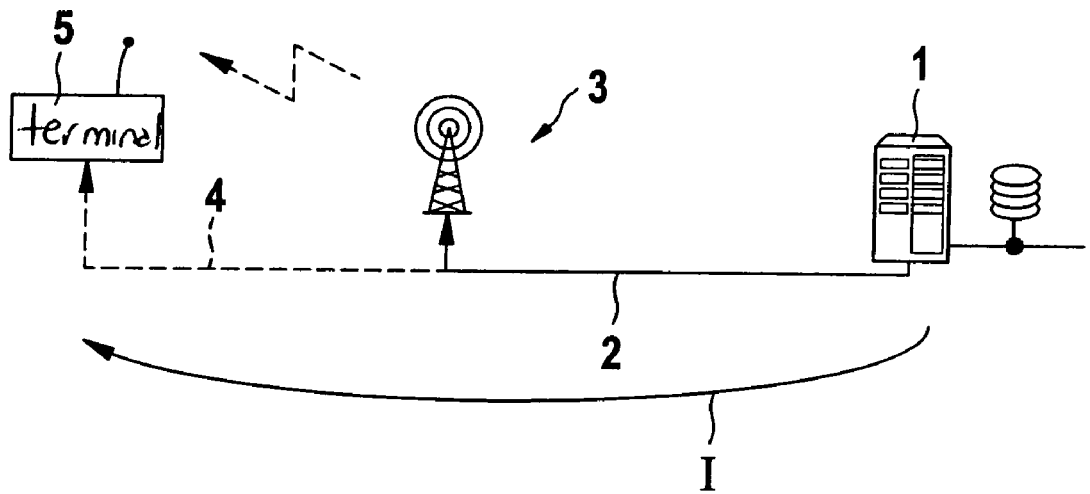
FIG. 1 shows a schematic diagram to illustrate a connection request from a central computer (server) to a terminal (client).

FIG. 1 shows a central computer (server) 1, which is connected to facilities 3 of a mobile wireless operator via line 2. A terminal 5 may be reached via a mobile wireless network 4. FIG. 1 shows the situation of the server requesting a connection to terminal 5. This is symbolized in FIG. 1 by arrow I. Terminal 5, which is a mobile terminal in the preferred exemplary embodiment and is installed in a motor vehicle in particular, is to be prompted by the server to establish a connection, a communication connection in particular, to the server. For this purpose, server 1 calls the terminal via mobile wireless network 4. The call is triggered by a server input or by an appropriate external query to the server, for example, via a mobile wireless phone, the Internet, via the server's keyboard, etc. In this case, the telephone numbers of the terminal(s) associated with the querier are known to the server. Such information is stored in a database, for example, as a function of the caller's telephone number or as a function of an ID code or a transmitted command.

In the preferred embodiment, server 1 dials the assigned telephone number(s) according to an external request by selecting a call number in a database or table stored in a memory as a function of the number of the call or external command received (e.g., via the Internet, SMS, etc.) or as a function of the requesting user. The server then calls the selected call number, i.e., the thus identified terminal, via the network or via a direct connection and a dial-in node via a mobile wireless network. The terminal receives the call and subjects it to a check, for example, regarding the type of call to which it is to be assigned. A distinction may thus be made between a normal voice call and a call that is to result in establishing a connection to a server. In an example preferred embodiment, this distinction is made on the basis of the sender's telephone number, i.e., it is checked whether the transmitted telephone number of the caller agrees with a telephone number stored in the terminal as a telephone number registered for establishing a connection. If this is not the case, the call is a regular telephone call, and it is forwarded to the telephone unit of terminal 5.

If it is a call via which establishment of a connection is requested, the device either immediately terminates the incoming call (without the connection having been established) and starts establishing the connection or it accepts the call automatically to perform additional checks or data exchange or to transmit an acknowledgment of receipt. Also in this case, the connection is subsequently terminated in order to establish a new connection from the client (terminal) to the control center (server).

Alternatively to or in combination with the above-described recognition of the sender's telephone number, a special type of call is used for identifying a telephone call requesting the establishment of a connection. In the case of mobile wireless devices, a special data call is made, which is recognized as such by the device upon receipt. This is understood hereinafter as a type of call which a terminal (e.g., a GSM terminal) is able to distinguish from the normal voice call when such a call is received. The structure of these different calls and their distinguishing features are to be found in the particular mobile wireless specification (e.g., the Technical Specification of GSM). Terminal 5 then evaluates such a call as a request to establish a connection, terminates the current connection (or performs the above-described additional steps and then terminates the connection), and starts establishing a new connection to the server.

In the above-described exemplary embodiments, the server call requesting the establishment of a connection is terminated by the client. In another embodiment, the call is terminated by the server. If the client terminates the call, the server assumes that the terminal has received and understood the call, even without the terminal having to explicitly accept the call, for example, by transmitting an acknowledgment. If the server is to terminate the call, it does so when the terminal transmits an acknowledgment or after the elapse of a certain time period without acknowledgment by the terminal. In the first case, the server waits for a connection to be established by the client; in the second case, the server transmits a new request and/or relays an error message to the requesting outside user.

Figure 2:
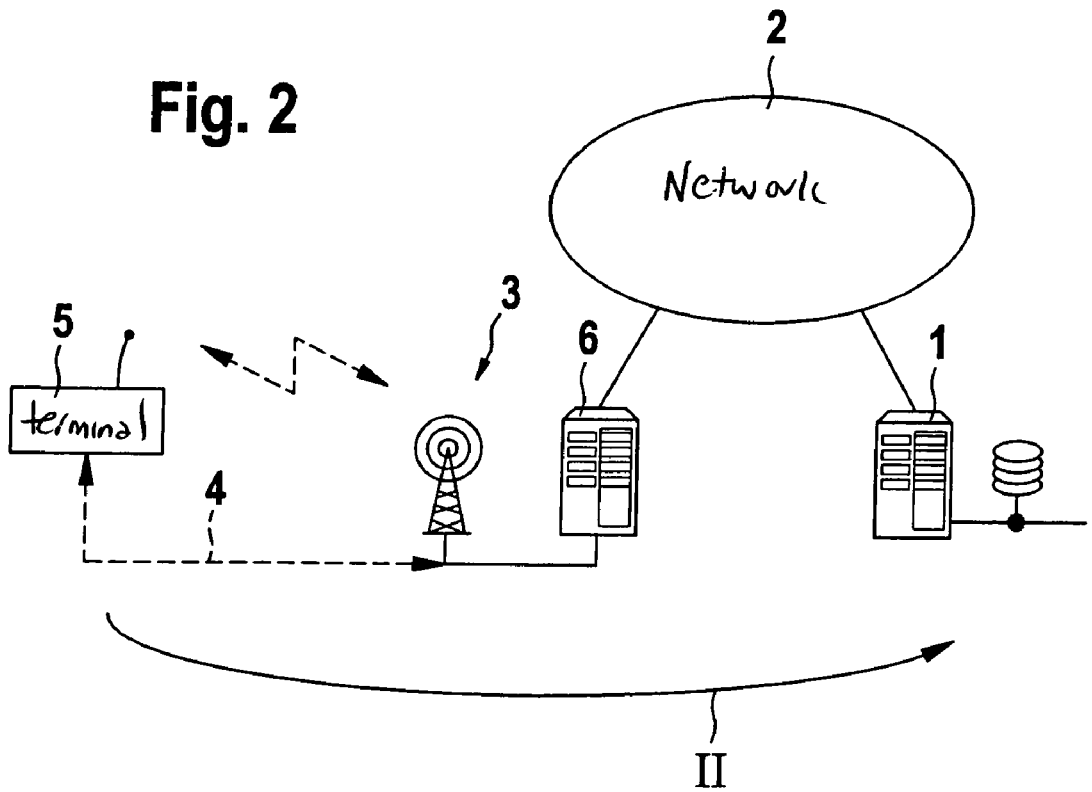
FIG. 2 shows a schematic diagram to illustrate the establishment of communication from client to server.

If the terminal has recognized a call as a request to establish a connection, it automatically starts establishing a connection to the server. This is schematically illustrated in FIG. 2 and symbolized by arrow II. In one exemplary embodiment the connection is established by dialing into a network. If the server accepts the call, the communication is started and is continued as question-answer communication (standard client-server communication), for example. In the example depicted in FIG. 2, terminal 5 transmits an appropriate request to establish a connection to server 1 via mobile wireless network 3, 4 via a dial-in node 6 and a direct connection or a network 2. The required telephone number is either predefined, i.e., permanently stored, in the terminal, or, if the previous call resulted in communication exchange, is transmitted from the server to the terminal. In one example embodiment, a plurality of connections are stored in terminal 5, one of which is established as a function of the telephone number transmitted in the previous call or as a function of appropriate information. As soon as the basic connection (dial-in connection) has been established, the terminal looks up server 1.

In this context, "looking up" means what a browser does, for example, when, after successful log-in into the Internet, one enters a www address and presses Return. It transmits a request to the server defined by the address (and receives an answer in return from it). "A plurality of connections" which may be stored in the terminal are mainly understood as different server (addresses) which may be requested via the network based on the telephone number transmitted in the previous call, for example. In another example embodiment, this also includes an approach according to which the client uses one of a plurality of different dial-in connections, depending on the previous incoming call of the server. A client-server connection is thus established and a client-server communication characterized by question and answer follows.

In one example embodiment, terminal 5 is a device equipped with a mobile wireless device, which is installed in a motor vehicle. The depicted communication connection and its establishment are used in particular in connection with the remote control of at least one component and/or one function of the motor vehicle and/or within the framework of remote diagnosis for transmitting diagnostic information of the motor vehicle.

The above-described procedures are implemented in terminal 5 and in server 1 via programs of at least one microcomputer. The flow charts of FIGS. 3 and 4 show samples of such programs on the basis of a preferred exemplary embodiment, representing the request for connection and the subsequent establishment of a connection.

FIG. 3 shows an example of implementation of the procedure in the server. The outlined program is started on the basis of an external request. This request is represented, for example, by a call over a telephone or a mobile wireless network or by an appropriate command entered via the Internet. In first step 100 this request is then authenticated. This may take place, depending on the embodiment, by checking the calling telephone number, via an ID code and/or passwords, etc. If the authentication is unsuccessful, the procedure is aborted and an error message is issued as applicable. If the authentication is successful, the above-mentioned request for connection is made via a data call or a call to a predefined terminal in next step 102. The telephone number or the address of this terminal is retrieved from a database, for example, as a function of the source of the external request. In the next step it is checked whether the call or the data call has been terminated by the receiver (terminal) or whether a predefined maximum time period or maximum number of call attempts has elapsed. In the latter case, it is assumed that the call or data call has not reached the terminal. In one exemplary embodiment the program is terminated and a feedback is sent to the external requestor according to step 106, or step 102 of transmitting a new request for connection is repeated. However, if the call from the terminal has been terminated, it is checked in step 108 whether a connection was established from the terminal to the server within a maximum answer time. If this is not the case, the program is terminated, and in some cases a feedback is sent to the external requester according to step 110. If the connection is established within a maximum answer time, the communication with the terminal intended for this case is carried out according to step 112. In one exemplary embodiment, this communication is a question-answer game (client-server communication), the server being able to transmit data to the terminal or receive data from the terminal. Thus, for example, after a connection for remote control of vehicle components has been established, codes are transmitted to the terminal, and the terminal analyzes these codes for controlling vehicle components or functions.

FIG. 4 shows an implementation as a program on the terminal's side. This terminal has a mobile wireless device and a processing unit which may be separate or integrated into the mobile wireless device; the microcomputer of the processing unit performs the above-described checks and actions.

The procedure illustrated in FIG. 4 is activated by a call or data call in the terminal. In first step 200 it is checked whether the call or the data call represents a request to establish a connection. Depending on the exemplary embodiment, this takes place on the basis of the type of call (e.g., data call) and/or on the basis of the caller's telephone number which has been communicated and/or on the basis of a transmitted code. If the call is not a request for connection, the call is transmitted to the telephone unit of the terminal according to step 203 and the procedure is terminated. The telephone unit then may carry out a regular telephone conversation.

If the call or the data call is a request to establish a connection as described above, the call is terminated by the terminal according to step 202. If further information is to be transmitted with the call, the call is accepted and a further check according to step 204 is performed on the basis of the transmitted information, for example, further identification on the basis of the ID code, etc. After the completion of this further check, the connection is terminated by the terminal. The terminal subsequently initiates a new connection to the caller or to the source of the data call. If this connection is established, communication between terminal and server, as described above, takes place according to step 206. In the case of the exemplary embodiment of a remote control, the desired action(s) is (are) performed or initiated according to step 210. In the case of remote diagnosis, the desired data is transmitted. Depending on the volume of the questions, steps 206 and 210 are repeated. After the communication is completed, the connection is terminated, preferably by the client, and the procedure is terminated.

One preferred exemplary embodiment of the above-described procedure is vehicle remote control/vehicle remote diagnosis. In this case, the vehicle includes a data communication unit having a mobile telephone and a WAP browser. An Internet connection is established via this unit, and WAP pages are looked up (traditional client-server communication). The data communication unit (terminal) is used in this exemplary embodiment for performing at least one defined action in the vehicle in a remote controlled manner, for example, turning an auxiliary heating unit on or off. To trigger such an action, the vehicle user connects from any place to a server or a service center capable of handling the vehicle communication for this procedure, for example, via the Internet, via WAP, over the phone, etc., authenticates himself/herself, and transmits certain predefined information. For example, the user may transmit codes corresponding to a certain action via SMS. Upon correct authentication of the caller, i.e., the Internet or WAP user, the server places a data call to the data communication unit in the vehicle. The incoming call is recognized there and the transmitted call number is compared with the call number stored in the device. If they agree, the data communication unit of the vehicle immediately terminates the call and establishes an Internet connection. A WAP address stored in the device is then also looked up. This is the address of the above-mentioned server, in the present case of the Web server which initiated the connection. The communication for vehicle remote control between data communication unit and server is thus established. A standard client-server communication type, WAP in this instance, is used. Other exemplary embodiments use other standard communication types which are suitable for mobile terminals. After the communication has been established, the client is authenticated and logged in to the server. Special security mechanisms, security mechanisms known from WAP in the present preferred case, are used here. Unauthorized use of the vehicle remote control service is thus effectively prevented. All data required for the procedure is exchanged via the communication connection which has been established. After completion of this exchange, the connection is terminated and the action in the vehicle is performed by the telecommunication unit, in particular by transmitting appropriate commands to one or more control units.

The above-described procedure is not only used in connection with vehicle remote control, but also in connection with remote diagnosis procedures in which specific information is retrieved from the vehicles (for example, measured values) by the server.

The above-described example embodiment of the present invention refer to both the method and the system as a whole and separately to the terminal and server, the method carried out there, and the computer programs used for performing the method.

In summary, it should be noted that a possibly important aspect of the described method and the described device is that the client-server connection is initiated by the server instead of being initiated by the client. A telephone call by the server is used for this purpose, which prompts the client to establish a connection.

What is claimed is:

1. A method for establishing a communication connection between a control center and a terminal which is situated in a motor vehicle, comprising:
 requesting, by a call by the control center, establishment of a connection to the terminal;
 terminating, by the terminal, the call without accepting the call;
 checking, by the terminal, on the basis of data delivered by the call, whether the call is at least one of intended to initiate a connection to the control center and authorized to initiate a connection with the control center;
 in response to a determination that the connection to the control center is permitted to be established, automatically establishing, by the terminal, a communication connection to the control center; and
 transmitting data via the established communication connection.

2. The method as recited in claim 1, wherein the communication connection is established via a mobile wireless network and the call is a call specified in a mobile wireless standard.

3. The method as recited in claim 2, wherein the call is one of a telephone call and a data call.

4. The method as recited in claim 1, further comprising:
 checking the request in the terminal based on one of a telephone number of a requestor and transmitted data.

5. The method as recited in claim 1, wherein the communication connection is established automatically by the terminal dialing into a network.

6. The method as recited in claim 1, wherein the terminal terminates the call prior to checking whether the connection to the control center is permitted to be established, and wherein the terminal subsequently establishes the communication connection after the checking step.

7. The method as recited in claim 1, wherein communication between the terminal and control center takes place according to a standardized client-server communication type.

8. A method for establishing a communication connection between a control center and a terminal, comprising:
 transmitting, by the control center, a call to a selected terminal as a function of an external request, and expecting a request for connection from the terminal after the terminal has performed the steps of: a) terminating the call without accepting the call; and b) checking, on the basis of data delivered by the call, whether the call is at least one of intended to initiate a connection to the control center and authorized to initiate a connection with the control center; and
 subsequently communicating data between the control center and the terminal.

9. The method as recited in claim 8, wherein the communication connection is established via a mobile wireless network and the call is a call specified in a mobile wireless standard.

10. The method as recited in claim 9, wherein the call is one of a telephone call and a data call.

11. The method as recited in claim 8, further comprising:
 checking the request in the terminal based on one of a telephone number of a requestor and transmitted data.

12. The method as recited in claim 8, wherein the terminal terminates the call prior to checking whether the connection to the control center is permitted to be established, and subsequently communicating data after the checking step.

13. The method as recited in claim 12, wherein the communication takes place according to WAP.

14. The method as recited in claim 8, wherein communication between the terminal and control center takes place according to a standardized client-server communication type.

15. The method as recited in claim 14, wherein the communication takes place according to WAP.

16. A method for establishing a communication connection between a control center and a terminal which is situated in a motor vehicle, comprising:
- receiving, by the terminal, a call requesting establishment of a connection;
- terminating, by the terminal, the call without accepting the call;
- checking, by the terminal, on the basis of data delivered by the call, whether the call is at least one of intended to initiate a connection to the control center and authorized to initiate a connection with the control center;
- in response to a determination that the connection to the control center is permitted to be established, automatically establishing, by the terminal, a communication connection to the control center; and
- transmitting data via the established communication connection.

17. The method as recited in claim 16, wherein the communication connection is established via a mobile wireless network and the call is a call specified in a mobile wireless standard.

18. The method as recited in claim 17, wherein the call is one of a telephone call and a data call.

19. The method as recited in claim 16, further comprising:
- checking the request in the terminal based on one of a telephone number of a requestor and transmitted data.

20. The method as recited in claim 16, wherein the communication connection is established automatically by the terminal dialing into a network.

21. The method as recited in claim 16, wherein the terminal terminates the call prior to checking whether the connection to the control center is permitted to be established, and wherein the terminal subsequently establishes the communication connection after the checking step.

22. The method as recited in claim 16, wherein communication between the terminal and control center takes place according to a standardized client-server communication type.

23. The method as recited in claim 22, wherein the communication takes place according to WAP.

24. A system for establishing a communication connection between a control center and a terminal which is situated in a motor vehicle, data being transmitted via the established communication connection, comprising:
- a control center including an arrangement configured to transmit a request to establish a connection via a call by a transmission path; and
- a terminal including an arrangement which is configured to receive the call, terminate the call without accepting the call, check, on the basis of data delivered by the call, whether the call is at least one of intended to initiate a connection to the control center and authorized to initiate a connection with the control center, and in response to a determination connection automatically establish a connection to the control center.

25. A system for establishing a communication connection between a control center and a terminal, data being transmitted via the established communication connection, comprising:
- a control center including an arrangement configured to place a call to a selected terminal based on an external request, and configured to expect a request to establish a connection from the terminal after the terminal has performed the steps of a) terminating the call without accepting the call; and b) checking, on the basis of data delivered by the call, whether the call is at least one of intended to initiate a connection to the control center and authorized to initiate a connection with the control center, and configured to subsequently perform a client-server communication with the terminal.

26. A system for establishing a communication connection between a control center and a terminal situated in a motor vehicle, data being transmitted via the established communication connection, comprising:
- a terminal including an arrangement configured to: a) receive a request call from the control center to establish a connection; b) terminate the call without accepting the call; c) check, on the basis of data delivered by the call, whether the call is at least one of intended to initiate a connection to the control center and authorized to initiate a connection with the control center, and d) in response to a determination that the connection to the control center is permitted to be established, automatically establish at least one predefined connection to the control center.

27. A non-transitory computer-readable storage medium storing a computer program having program code which, when executed by a computer at a control center, causes the computer to: a) place a call to a selected terminal based on an external request; b) expect a request to establish a connection from the terminal after the terminal has i) terminated the call without accepting the call and ii) checked, on the basis of data delivered by the call, whether the call is at least one of intended to initiate a connection to the control center and authorized to initiate a connection with the control center, and c) subsequently perform a client-server communication with the terminal.

28. A non-transitory computer-readable storage medium storing a computer program having program codes, which when executed by a computer at a terminal in a motor vehicle, causes the computer to: a) receive from a control center a request call to establish a connection to the control center; b) terminate the call without accepting the call; c) check, on the basis of data delivered by the call, whether the call is at least one of intended to initiate a connection to the control center and authorized to initiate a connection with the control center, and d) in response to a determination that the connection to the control center is permitted to be established, automatically establish at least one predefined connection to the control center.

* * * * *

UNITED STATES PATENT AND TRADEMARK OFFICE
CERTIFICATE OF CORRECTION

PATENT NO. : 8,406,750 B2
APPLICATION NO. : 10/517740
DATED : March 26, 2013
INVENTOR(S) : Sonnenrein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1476 days.

Signed and Sealed this
First Day of September, 2015

Michelle K. Lee
*Director of the United States Patent and Trademark Office*